3,824,091
METHOD OF ANCHORING FINELY GRANULATED DUST MATERIAL FROM PURIFYING PLANTS FOR METALLURGIC WASTE GASES IN ORDER TO RENDER THE DUST DISPOSABLE OR UTILIZABLE
Harry Francis Holman, Kristiansand, Norway, assignor to Hunfos Fabrikker, Vennesla, Norway
Filed July 19, 1972, Ser. No. 273,268
Claims priority, application Norway, July 21, 1971, 2,781/71
Int. Cl. A01g 7/00
U.S. Cl. 71—12                    4 Claims

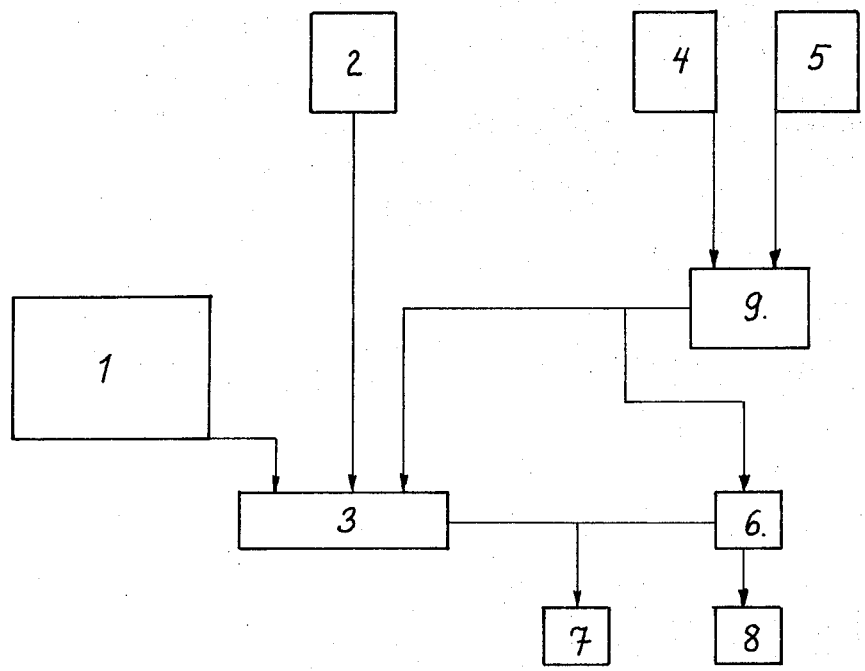

ABSTRACT OF THE DISCLOSURE

A method to render the dust material from purifying plants for metallurgic waste gases disposable or utilizable.

---

The invention relates to a method of anchoring finely granulated dust material from purifying plants for metallurgic waste gases in order to render the dust disposable or utilizable. The product produced can be used, inter alia, for soil improvement agents, basic filler material and the like.

As greater demands are made in regard to industrial pollution, problems arise in disposing of waste substances in such a manner that they are not dangerous to the environment, while, at the same time, it is desirable that the waste products be employed for useful purposes.

Within the metallurgic industry, large amounts of metallurgic dust are produced from purifying plants for waste gases and disposal of such dust in the environment entails the risk of the dust being carried away by water and, in this manner, represents a danger of water pollution.

Metallurgic dust occurs in relatively large amounts and different methods have been proposed for using the dust for various purposes depending on local conditions. With increasing official restrictions regarding industrial waste, the amount of waste products to be disposed of also increases.

From Norwegian Pat. No. 116,721, a method is known of utilizing the $SiO_2$-containing dust recovered from the smoke of metallurgical processes, this being used as anti-caking agents with which fertilizer substances are coated in order to decrease the tendency of the fertilizers to cake together.

However, the amount of metallurgic dust occuring is far greater than can be utilized by the method according to Norwegian Pat. No. 116,721, so that it is still necessary to provide a method of utilizing this metallurgic dust in such a manner that it is either disposable or can be employed for useful purposes.

According to the invention, the utilization of an unlimited amount of metallurgic dust is made possible by means of a comparatively simple method which is not so dependent on local conditions and which resides in the fact that the metallurgic dust, in general, predominantly containing silicon dioxide and having a relatively large specific surface, is anchored in an organic material. The dust which is very finely divided has a specific surface of approximately 15-20 $m^2/g$., which is much greater than, for example, air-borne ash which has a specific surface of 0.30-0.35 $m^2/g$. Anchoring in the organic material is due to the large surface of the dust and the moisture of the organic substance, the binding properties of the organic material being utilized for the dust in order to arrive at a disposable material having a suitable moisture content.

The dust is anchored in the organic material such that a permanent bond is established and the final material retains its structure under varying climatic conditions.

By anchoring the metallurgic dust in the organic material, the dust is not carried away by water and the resulting product can be utilized as soil-improving material, basic filler material and the like.

Since the final product has a suitable moisture content, micro-organisms flourish in this material and the material can be used as a base for plant cultivation.

The invention thus relates to a method of anchoring finely divided dust material from purifying plants for metallurgic waste gases in order to render the dust disposable or utilizable, the method being characterized in that the dust, by means of mixing and grinding processes, is anchored in an organic material having a moisture content such that the final, disposable product has a moisture content, for example 40-50%, which allows it to be readily handled, an auxiliary binder being optionally used. In an advantageous embodiment example according to the invention, the organic material can preferably be bark and can also be sludge from industial or official purifying plants, municipal garbage or peat. If sulfite leach is used as the auixiliary binder, the sulfite leach is preferably neutralized.

The moisture content of the finished product is adapted such that good conditions are achieved for micro-biological culture.

The finally divided metallurgic dust is anchored in an organic substance, possibly by means of a binder, for example, sulfide leach or modified sulfite leach, the dust being mixed together in a cutting, grinding and/or mixing operation with either bark, peat, municipal garbage or sludge, containing organic material from industrial or official purifying plants, or a combination of these components. It is the object of such mechanical processes to establish a good bond between the mineral and the organic material. The content of saccharides and lignosulfonates of the sulfite leach also contributes to this end.

The general object of the invention is to render the metallurgic dust disposable with reduced risk of desludging even when stored/dumped in open country, further to render the final product suitable for useful purposes, for example, soil improving agents, by reason of the good structure-forming properties thereof and by reason of the content of cultivating properties for micro-organisms and also by reason of the large specific surface of the mineral particles which is again important in the function of water absorption. The term soil improving agents is not intended to include fertilizing substances here.

An important feature of the invention is that the dry, metallurgic dust imparts to the moist organic waste products a suitable dry content with no prior drying. The finished product can contain 40-50% moisture and organic material is preferably used in amounts of 50% calculated on the dry substances. The amount of the organic material depends on the moisture content, it being obvious that, with an organic material which has a greater moisture content, less should be used than with an organic material having a low moisture content.

In the drawing, a working diagram is illustrated for a practical execution of the method according to the invention, 1 signifying storage for bark, peat and garbage, and 2, transport and storage tank for metallurgic dust, and 3, a tearing and/or grinding member and 4 a tank for sulfite leach, and 5 a tank for ammonia, 6 mixing and sieving unit, 7 transport box/depot, 8 transport box/depot and 9, location of neutralization for the sufite leach.

An important feature of the invention is that the particular properties of the materials employed are utilized such that large amounts of metallurgic dust are bonded in a technically expedient manner and that the metallurgic dust, in combination with other dry or wet waste substances, optionally with the addition of a binder, yields readily manageable and transportable products which are used as soil improving agents, filler material or the like, and which are well capable of retaining water. The products according to the invention can be employed for useful purposes by reason of their special structure, and the utilization of the method is very little dependent on the location of the metallurgical industry in question.

By means of the invention, a combination of two or more, possibly injurious, non-utilizable waste groups can be used to form a product which can be disposed of without risk and which is also utilizable as a useful product.

What is claimed is:

1. A method of anchoring finely divided dust material from purifying plants for metallurgic waste gases in order to render the dust disposable or utilizable comprising mixing and grinding the dust with an organic material from the group consisting of bark, sludge, garbage and mixtures of garbage and sludge, and an auxiliary binding agent in amounts sufficient to produce a product which has sufficient moisture so as to be easy to handle and wherein the dust is bonded to said organic material.

2. A method according to Claim 1 wherein the proportions of dust and organic material are such that the final product has a moisture content of 40 to 50%.

3. A method according to Claim 2 wherein the content of organic material in the final product is 50%.

4. A method according to Claim 1 wherein the binder is sulfite leach or neutralized sulfite leach.

References Cited

UNITED STATES PATENTS

| | | | |
|---|---|---|---|
| 3,640,696 | 2/1972 | Goldmann | 71—62 X |
| 3,619,163 | 11/1971 | Alertsen | 71—62 X |
| 3,235,369 | 2/1966 | Eweson | 71—9 |
| 3,561,943 | 2/1971 | Gay, Jr., et al. | 71—23 |
| 3,141,759 | 7/1964 | Usse | 71—25 X |
| 3,241,943 | 3/1966 | Bystrom | 71—25 X |
| 2,117,087 | 5/1938 | Formhals | 71—25 X |
| 3,387,965 | 6/1968 | Kiyooka et al. | 71—25 |
| 3,645,714 | 2/1972 | Heming | 71—23 |
| 2,780,031 | 2/1957 | Bryant | 71—62 X |
| 3,034,882 | 5/1962 | Renwick | 71—23 |

CHARLES N. HART, Primary Examiner

R. BARNES, Assistant Examiner

U.S. Cl. X.R.

47—9; 71—13, 14, 23, 62